April 3, 1951 M. R. WINKLER 2,547,027

VIBRATING REED CONTROLLED OSCILLATOR

Filed Jan. 2, 1948

INVENTOR.
Marion R. Winkler
BY
Foorman L. Mueller
Atty.

Patented Apr. 3, 1951 2,547,027

UNITED STATES PATENT OFFICE 2,547,027

VIBRATING REED CONTROLLED OSCILLATOR

Marion R. Winkler, La Grange Park, Ill., assignor to Motorola, Inc., Chicago, Ill., a corporation of Illinois Application January 2, 1948, Serial No. 343

7 Claims. (Cl. 250—36)

This invention relates generally to oscillators and more particularly to an oscillator system including vibrating reeds for determining the frequency thereof so that the oscillator frequency will be held within very narrow limits.

Oscillator systems for producing audible tones are used in many applications as, for example, electronic musical instruments and in selective signalling systems. Although in some applications the frequency requirements are not so severe, in certain applications it is required that the frequency of the oscillators be held within very small limits. This is the case in selective calling systems for use in mobile communication equipment wherein it is desired to provide a large number of possible calls within a limited frequency range. In order to accomplish this satisfactorily, the tone oscillator used must be very accurate so that closely adjacent frequencies can be used without interference with each other. Although various means have been provided for stabilizing oscillators, such as the use of crystals, these systems have not been practical for low frequency operation. Further, such systems have been relatively complicated and expensive and, as a plurality of oscillators are required in a selective calling system having a plurality of stations, the complete system becomes relatively complicated and involved.

It is, therefore, an object of the present invention to provide an improved tone oscillator, the frequency of which can be very accurately controlled.

A further object of this invention is to provide a simple tone oscillator, the frequency of which is controlled by a vibrating reed structure.

A feature of this invention is the provision of a tone oscillator in which feedback is provided through a vibrating reed filter so that oscillations are produced only at the natural frequency of the reed system.

A further feature of this invention is the provision of an oscillator having output and input circuits individually coupled to a pair of reeds supported on a common mounting, so that feedback is provided for the oscillator at a particular frequency which depends upon the characteristics of the reeds.

Another feature of this invention is the provision of a tone oscillator which includes a vibrating reed structure for providing feedback and a phase shifting network for compensating for the phase shift produced by the reed structure.

A still further feature of this invention is the provision of a unique double reed system which is small and compact and which is adapted to transfer energy from one circuit to another circuit at one particular frequency.

Further objects, features and advantages will be apparent from a consideration of the following description taken in connection with the accompanying drawings in which.

In practicing the invention there is provided a vacuum tube oscillator having input and output circuits which are coupled through a vibrating reed filter. The filter is arranged to provide the feedback necessary to produce oscillations at a particular frequency. This is accomplished by a reed structure including a pair of reeds mounted on a common support with a coil about one of the reeds connected in the output circuit of the oscillator and a coil about the other reed connected in the input circuit. The support for the reeds is so arranged that energy is transferred from one reed to the other at the natural frequency of the vibrating reeds to provide the feedback required to produce oscillations. To compensate for the phase shift produced in the filter, a compensating network is provided so that the feedback voltage will be in the proper phase to provide sustained oscillations.

Figure 1:
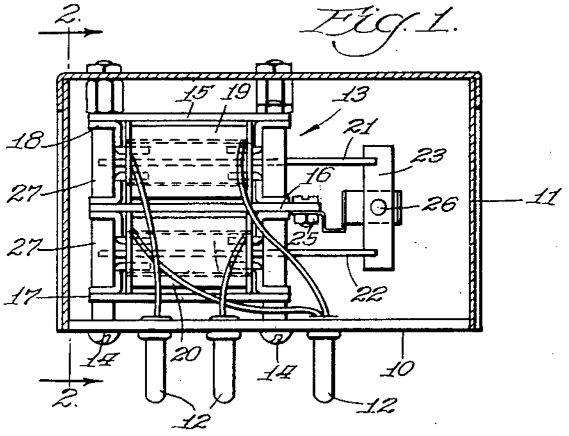
Fig. 1 is an elevation view of a plug-in double reed filter in accordance with the invention.
Figure 2:
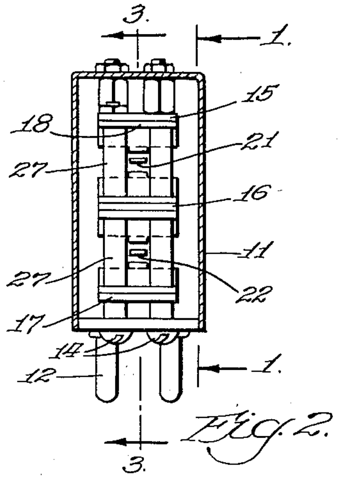
Fig. 2 is an end view along the lines 2—2 of Fig. 1.

Referring now to Figs. 1 and 2, the vibrating reed structure is constructed as a plug-in unit including a base portion 10, a cover portion 11, and plug-in terminals 12. The vibrating structure 13 of the unit is completely enclosed by the base and cover to provide a neat appearing unit. The vibrating structure is supported on the base 10 by four bolts 14 and includes three magnets 15, 16 and 17 having pole pieces 18 thereon which form two separate magnetic circuits. Coils 19 and 20 are provided in the magnetic circuits being held in position by the pole pieces 18. A pair of vibrating reeds 21 and 22 are positioned in the fields produced by the magnets and coils and are supported in a rigid member 23. The rigid member 23 is supported by a resilient but relatively stiff bracket 24 which is anchored to the center magnet 16 by bolts 25. The rigid support 23 is removably secured to the bracket 24 by a screw indicated at 26. As shown clearly in Figs. 2 and 3, the magnets 15, 16 and 17 and the pole pieces 18 connected thereto are supported by the bolts 14 and properly positioned by cylindrical spacers 27 which surround the bolts and position the magnets and pole pieces with respect to each other.

Figure 3:
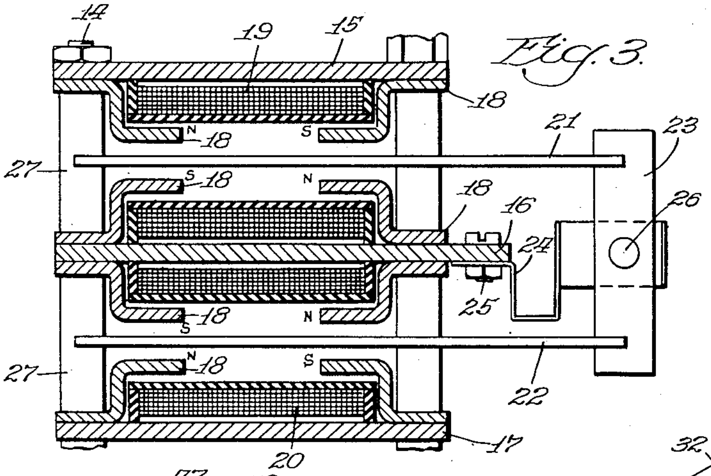
Fig. 3 is a cross-sectional view along the lines 3—3 of Fig. 2.

The magnets 15 and 17 are magnetized in one direction and the magnet 16 is magnetized in the opposite direction so that the pole pieces are of the polarities indicated by the letters S and N (representing south and north poles) in Fig. 3. It is, therefore, seen that a balanced system exists which normally would allow the reeds 21 and 22 to remain at rest centrally of the pole pieces. Current applied to the coil 19 will tend to increase one field and decrease the other so that the reed 21 will be moved. It is well known when currents of a particular frequency are applied to the coil, the vibrations in the reed will reinforce each other resulting in sustained vibrations. This frequency is known as the natural frequency of the reed. Such sustained vibrations will be transferred through the base 23 to reed 22 which moves toward one pair of pole pieces or the other to thereby unbalance the fields and induce a voltage in the coil 20.

Figure 4:
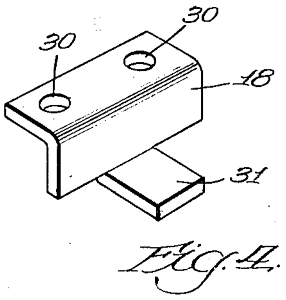
Fig. 4 is an enlarged detail of a pole piece of the reed structure.

Fig. 4 illustrates the detailed construction of the pole pieces 18 which include openings 30 for receiving the bolts 14. The pole pieces also include tongues 31 which are positioned inside the coils 19 and 20 to bring the fields of the magnets inside the coils and to mechanically position the coils and prevent disassembly thereof. The reed support 23, bracket 24, spacers 27 and bolts 14 are all preferably made of non-magnetic material so that the required magnetic fields are not shunted thereby.

Figure 5:
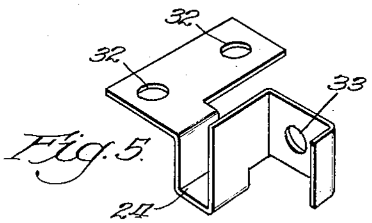
Fig. 5 is an enlarged detail of the mounting bracket for the vibrating reeds.

Fig. 5 illustrates in detail the mounting bracket for the support 23 which carries the reeds 21 and 22. The bracket 24 includes openings 32 for securing the same to the center magnet and an opening 33 to receive the bolt 26 for securing the rigid member 23 thereto. The bracket 24 is resilient enough to permit the transfer of energy from one reed to the other so that equal and opposite vibrations are produced therein. The bracket must be stiff enough to hold the reeds in the proper position in the fields. The configuration of the bracket is such that limited universal movement of the member 23 is provided. This allows the vibrating structure to shift to automatically compensate for inaccuracies in construction.

Figure 6:
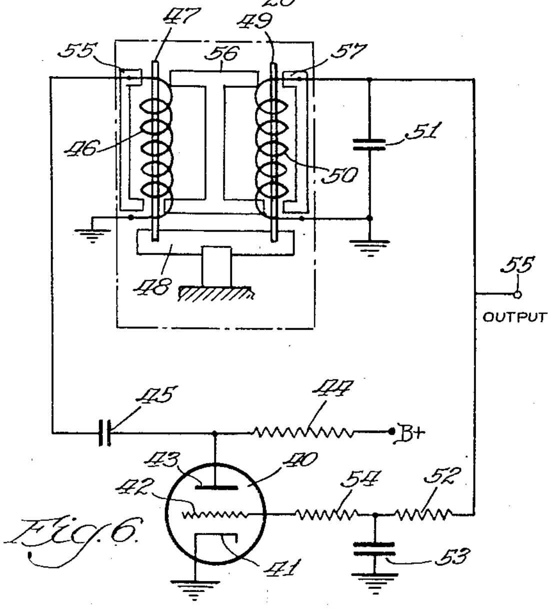
Fig. 6 is a circuit diagram illustrating the use of the vibrating reed filter in an oscillator circuit.

Fig. 6 illustrates a tone oscillator which may utilize the vibrating reed structure as above described. The oscillator includes a vacuum tube 40 having a cathode 41, a grid 42 and a plate 43. The plate 43 is connected to a plus B power supply through resistor 44 and coupled through condenser 45 to the winding 46 positioned about the vibrating reed 47. Energy applied to the winding 46 will produce a field which reacts with the field produced by magnets 55 and 56 to cause vibration of the reed 47. This vibration of the reed 47 will be transferred through the rigid support 48 to the second reed 49. Vibration of reed 49 in a suitable field which may be produced by magnets 56 and 57 will cause sinusoidal oscillations to be induced in the coil 50 positioned thereabout. A condenser 51 is connected across the coil 49 to tune the coil so that the voltage developed thereacross at the frequency of the reeds will be increased. This voltage is applied to the input of the vacuum tube through a phase correcting network such as the network made up of resistor 52 and condenser 53.

As is well known, the vibrating reeds 47 and 49 described above will have a natural frequency of vibration which is effective in the present system to cause regenerative feedback resulting in oscillations at this particular frequency. It has been found that the transfer of the vibrations from reed 47 to reed 49 at a frequency of maximum amplitude is accompanied by a phase shift sometimes as great as 90 degrees. Phase shifts are also produced by the various circuit components such as condensers 45 and 51. This may be corrected by shifting the phase of the voltage from coil 50 so that the voltage applied through the coupling resistor 54 to the grid 42 of the triode 40 is substantially in phase with the voltage generated within the tube. Resistor 52 and condenser 53 are provided especially for providing the desired phase relationship within the tube 40. It is obvious that the regenerative feedback produced through the windings at the particular frequency to which the reeds respond will cause oscillations at that frequency. As the voltage induced in the coil 50 is substantially a pure sine wave the output voltage appearing at terminal 55 will be a sine wave.

It is apparent that reed structures as shown in Figs. 1 to 5 can be used in the oscillator of Fig. 6. By use of this construction, the reed structure can be plugged into a chassis so that both electrical connection and mechanical support is provided by terminals 12. Only three terminals are required for making connection to the coils as one side of each coil may be grounded as is apparent from Fig. 6. The mounting screws 14 may be of such length to extend through the cover portion 11 to thereby support the cover portion in position on the base 10.

In order to provide oscillators having various natural frequencies, reeds of different thicknesses may be used. However, for low frequencies this would result in very thin reeds if the length of the reeds was held the same. This provides a flux path through the reed of smaller cross section to provide a higher reluctance path and consequently a smaller driving force. This can be overcome by use of longer reeds which may have a larger cross section. Longer reeds are also desirable at low frequencies as they permit greater over-all amplitude of vibration for the portions of the reeds which are in the magnetic fields thereby improving the amplitude of the induced oscillations at low frequencies.

Figure 7:
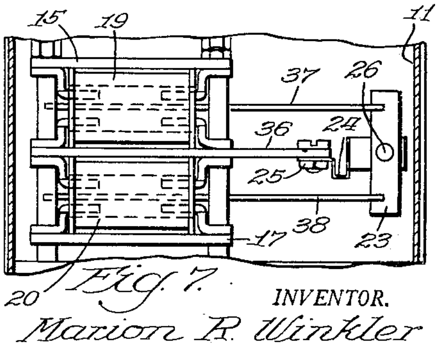
Fig. 7 illustrates the manner in which longer reeds can be used in the vibrating reed structure.

Fig. 7 shows the manner in which longer reeds may be used in the structure described. This is accomplished by using a longer center magnet 36 which is effective to support the longer reeds 37 and 38 in a position so that the ends thereof are positioned in the magnetic field. In the structure illustrated, mounting bracket 24 is secured to the longer center magnet 36 and supports the mounting member 23 for the reeds in the same manner as in the structure described above. This permits the use of identical mounting brackets and reed supports regardless of the lengths of the reeds with the difference in lengths being compensated for by using a magnet of the required length in the center portion of the structure.

It is apparent that the tone oscillator in accordance with the invention is of relatively simple construction. The mechanical filter is effective to limit the feedback to a very narrow range of frequencies so that the oscillator will always operate within this range. Without changing the components of the structure except the center magnet and the reeds, vibrating reeds of different lengths can be used to provide the feedback required at different frequencies.

While I have described certain embodiments of my invention, it is apparent that various changes and modifications can be made therein without departing from the intended scope of the invention as defined in the appended claims.

I claim:

1. In an oscillator, means for producing feedback for sustaining oscillations of a predetermined frequency including in combination, first and second magnetic reeds each having a natural frequency of vibrations substantially equal to said predetermined frequency, a magnetic structure about said reeds including a central elongated magnet and a pair of elongated magnets spaced therefrom, pole pieces secured to said magnets to provide a pair of opposed magnetic fields on opposite sides of each of said reeds, supporting means for said reeds including a rigid mounting member for interconnecting said reeds and a resilient support for securing said rigid mounting member to said central magnet, first and second windings individually positioned about said reeds and supported by said magnetic structure, and a feedback circuit including first and second windings for applying signals to said first winding, said first winding producing a fluctuating magnetic field superimposed on said balanced magnetic field which causes vibration of said first reed when said fluctuations occur at said predetermined frequency, said rigid mounting member transmitting vibrations of said first reed to said second reed causing said second reed to vibrate at said natural frequency, said second winding translating the fluctuations in the field about said second reed caused by movement thereof in said balanced field into electrical oscillations occurring at said predetermined frequency.

2. In an oscillator, means for producing feedback for sustaining oscillations of a predetermined frequency comprising, first and second magnetic reeds each having a natural frequency of vibrations substantially equal to said predetermined frequency, a magnetic structure about said reeds including a central elongated permanent magnet and a pair of elongated permanent magnets spaced therefrom, pole pieces secured to said magnets to provide a pair of opposed magnetic fields on opposite sides of each of said reeds, supporting means for said reeds including a rigid mounting member for interconnecting said reeds and a resilient support for securing said rigid mounting member to said central magnet which provides limited universal movement of said mounting member, windings about said reeds supported by said magnetic structure, and a feedback circuit including said windings for applying a signal to said winding about said first reed to thereby produce a fluctuating magnetic field superimposed on said balanced magnetic field which causes vibration of said first reed when said fluctuations occur at said predetermined frequency, said vibration of said first reed being transmitted through said rigid mounting member to said second reed causing said second reed to vibrate at said natural frequency, said winding about said second reed translating the fluctuations in the field about said second reed caused by movement thereof in said balanced field into electrical oscillations occurring at said predetermined frequency, said feedback circuit including means for shifting the phase of said electrical oscillations to provide oscillations which are substantially in phase with the signals of said predetermined frequency applied to said winding about said first reed.

3. An oscillator comprising an electron discharge valve having input and output electrodes, and a feedback system coupling said input and output electrodes for providing regenerative feedback therebetween at a predetermined frequency, said system including in combination, first and second windings, a magnetic structure providing a pair of magnetic paths about each of said windings and including permanent magnet means providing magnetic flux through said paths of each pair in opposite directions with respect to the associated windings, first and second magnetic reeds of such construction that the natural frequency of vibration thereof is the same as said predetermined frequency, said reeds being individually associated with said first and second windings and positioned adjacent to said magnetic paths about each of said windings to reduce the reluctance thereof, mounting means interconnecting said first and second magnetic reeds, means coupling said first winding to said output electrodes of said valve so that oscillations applied thereto provide a fluctuating field about said first winding and said first reed is caused to vibrate in response to oscillations of said predetermined frequency, said mounting means transmitting vibrations of said first reed to said second reed to cause said second reed to vibrate at said predetermined frequency, and means coupling said second winding to said input electrodes to apply the oscillations produced in said second winding by vibration of said second reed to said input electrodes, said last mentioned means including phase shifting means for providing oscillations to said input electrodes of such phase to cause regenerative action in said valve.

4. An electromechanical translating device for selectively passing signals of a predetermined frequency including in combination, first and second windings, a magnetic structure providing a pair of magnetic paths about each of said windings and including means providing magnetic flux through said paths of each pair in opposite directions with respect to the associated winding, first and second magnetic reeds having a natural frequency of vibration substantially the same as said predetermined frequency, individually associated with said first and second windings and positioned adjacent to said magnetic paths about each of said windings to reduce the reluctance thereof, rigid means interconnecting said first and second magnetic reeds, and resilient means for supporting said rigid means for limited movement with respect to said magnetic structure.

5. An electromechanical translating device including in combination, first and second windings, a magnetic structure providing a pair of magnetic paths about each of said windings and including means providing magnetic flux through said paths of each pair in opposite directions with respect to the associated winding, said magnetic structure including symmetrically positioned pole pieces forming an air gap in each of said magnetic paths, first and second magnetic reeds individually associated with said first and second windings and positioned adjacent to said pole pieces to reduce the reluctance of said magnetic paths, and a member interconnecting said first and second magnetic reeds for transmitting vibrations therebetween.

6. An electromechanical translating device including in combination, first and second windings, a magnetic structure including a central permanent magnet and a pair of permanent magnets spaced on either side thereof, a plurality of symmetrically positioned pole pieces connected to said magnets and providing a pair of magnetic paths about each of said windings with each of said paths including an air gap therein, said magnets being polarized to provide magnetic flux through said paths of each pair in opposite directions with respect to the associated winding, first and second magnetic reeds individually associated with said first and second windings and positioned adjacent to said air gaps in said magnetic paths to reduce the reluctance of said paths, rigid means interconnecting said first and second magnetic reeds, and resilient means for supporting said rigid means with respect to said magnetic structure.

7. An electromechanical translating device for selectively passing signals of a predetermined frequency including in combination, first and second windings, a magnetic structure including a central permanent magnet and a pair of permanent magnets spaced on either side thereof, a plurality of symmetrically positioned pole pieces connected to said magnets and providing a pair of magnetic paths about each of said windings with each of said paths including an air gap therein, said magnets being polarized to provide magnetic flux through said paths of each pair in opposite directions with respect to the winding associated with each pair, first and second magnetic reeds having a natural frequency of vibration which is the same as said predetermined frequency individually associated with said first and second windings and positioned intermediate said magnetic paths adjacent said air gaps thereof to reduce the reluctance of said paths, and means interconnecting said first and second magnetic reeds for transmitting vibration therebetween.

MARION R. WINKLER.

REFERENCES CITED

The following references are of record in the file of this patent:

UNITED STATES PATENTS

| Number | Name | Date |
|---|---|---|
| 1,516,947 | Beindorf | Nov. 25, 1924 |
| 1,919,139 | Walton | July 18, 1933 |
| 2,034,787 | Williams, Jr. | Mar. 24, 1936 |